United States Patent [19]

Breaux

[11] 4,104,937
[45] Aug. 8, 1978

[54] PIPE CLEANING BRUSH ASSEMBLY FOR PIPE FACING MACHINE

[75] Inventor: Earl J. Breaux, New Orleans, La.

[73] Assignee: J. Ray McDermott & Co., Inc., New Orleans, La.

[21] Appl. No.: 778,338

[22] Filed: Mar. 17, 1977

[51] Int. Cl.$^2$ .............................................. B23B 25/00
[52] U.S. Cl. .................................... 82/34 R; 82/4 C; 29/33 T; 29/81 F
[58] Field of Search .................. 82/4 C, 34 R, 46, 47, 82/50–54, 101; 15/88; 144/205; 29/81 F, 81 H, 33 T

[56] References Cited

U.S. PATENT DOCUMENTS

| | | | |
|---|---|---|---|
| 1,815,573 | 7/1931 | McManis | 15/88 |
| 3,307,254 | 3/1967 | Williams | 29/105 A |
| 3,733,939 | 5/1973 | Paysinger et al. | 82/4 C |

Primary Examiner—Leonidas Vlachos
Attorney, Agent, or Firm—Arnold, White & Durkee

[57] ABSTRACT

A pipe cleaning brush assembly for attachment to the rotatable face plate of a pipe facing machine for rotation therewith to clean the outer surface of a large diameter pipe section proximate the end thereof simultaneously with the machining of the pipe end face. The assembly includes a clamp having an inverted U-shaped member for placement over the edge of the face plate with a clamp jaw lock acting as a vise to grip the face plate and a clamp wedge lock engaging the face plate to resist centrifugal forces developed during rotation. A brush arm is pivotally mounted to the clamp, with a brush attached at one end and a cam at the other. The cam upon rotation causes the brush arm to pivot between a retracted position wherein the brush is held above the pipe surface to be cleaned and a position wherein the brush rests on the pipe surface.

10 Claims, 3 Drawing Figures

PIPE CLEANING BRUSH ASSEMBLY FOR PIPE FACING MACHINE

BACKGROUND AND PRIOR ART

The present invention relates to apparatus for preparing the ends of pipe sections that are to be welded together end-to-end; and more particularly, it relates to an improvement in apparatus for forming precision machined surfaces on the ends of large diameter pipeline sections such that the apparatus cleans the exterior of the pipe simultaneously with the machining of the end.

Pipelines for transporting crude oil and the like are formed by welding pipe sections together to form a pipe string which is buried underground or laid underwater from a lay barge. Generally, such pipelines will be comprised of pipe having a diameter of 30 inches O.D. or even larger. Preparatory to the welding of pipe sections together to form a pipe string, the end of each of the sections must be prepared for welding. Especially for automatic girth joint welding, a high precision is needed in end preparation operations. Preparation of the pipe ends prior to welding involves forming the joint in a true plane, that is one which is perpendicular or substantially perpendicular to the axis of the pipe. Preparation also involves cutting or machining of the pipe ends to provide a bevelled end such that the abutting ends to be welded together will provide a V-groove.

Apparatus for forming precision surfaces on the ends of large pipes include a rotating, tool-carrying face plate mounted on an axis that is firmly supported on an internal pipe clamp. Illustrative of pipe facing machines which cut pipe ends of various bevel configurations prior to welding is that disclosed in U.S. Pat. No. 3,733,939. The apparatus disclosed therein comprises a cage shaped double ended aligning clamp which axially aligns and firmly supports a rotatable face plate that carries multiple cutting tools mounted on spring-biased pivoted arms to permit radially inward and outward movement of the tools with respect to the pipe end. The face plate is hydraulically driven around the axis of the clamp to perform the machining operation.

Pipe sections which are to be positioned underwater on or under the ocean floor are usually precoated with a waterproofing and weighting material. These pipe sections are then joined together on the deck of a floating vessel or barge by butt welding into a continuous pipe string. The welded ends of the pipe string are then field-coated with a corrosion resistant material, and the resulting pipe string is subsequently launched from the stern of a lay barge to the ocean floor.

Accordingly, prior to welding of the pipe ends together, it is necessary to clean the ends of the pipe sections to provide a clean welding surface. It is both time consuming and troublesome to clean the pipe end in a separate operation; and particularly, since time is of the essence in an off-shore pipe laying situation, it would be desirable to reduce the time necessary for preparing and of cleaning pipe ends prior to welding.

Numerous machines have been developed for cleaning the outside surface of large-diameter pipe. Most of these are self-propelled units having brushes pulled into contact with the exterior surface of the pipe and moved relative thereto to buff the pipe. Most, if not all, of the self-propelled traveling pipe cleaning machines were developed for and are utilized in pipeline welding situations wherein the pipeline is to be laid underground. Accordingly, the pipe cleaning machines are for cleaning the entire exterior surface of a pipe prior to the pipe being primed with a protective corrosion proof coating and laid in a trench. The cleaning machines, therefore, will typically include a large boom having large internal combustion engines mounted thereon to power the pipe cleaning machine. Illustrative of prior art pipe cleaning machines are those disclosed in U.S. Pat. Nos. 3,495,288; 3,916,469; 2,064,577 and 1,815,573. All of these systems relate to an apparatus for cleaning and removing rust, scale and other corrosion or foreign matter adhering to the outside of pipes, so that a protective coating may be thereafter applied over the entire exterior surface of the pipe.

Accordingly, there is a need for apparatus particularly suited for use in offshore pipe laying situations for not only machining the annular ends of large diameter pipe in the field in preparation for welding, but also effecting the simultaneous cleaning of the pipe ends to remove excess coating, corrosion or foreign matter therefrom.

SUMMARY OF THE INVENTION

In accordance with the present invention, there is provided an improvement in pipe facing machines having a rotatable face plate for forming a precision machined surface on the end of a section of large diameter pipe as it is rotated with respect to the pipe, which improvement comprises a pipe cleaning brush assembly mounted on the face plate for rotation therewith to clean the outer surface of the pipe proximate the end of the pipe simultaneously with the machining of the pipe end. More specifically, the instant invention provides a pipe cleaning brush assembly for attachment to the rotatable face plate of a pipe facing machine which comprises a clamp for attachment to the face plate at the outer perimeter thereof, a brush arm fixed relative to the clamp, and a brush attached to the end of the brush arm.

In more specific aspects of the present invention, the brush arm is mounted for pivotal movement between a retracted position wherein the brushes held above the pipe surface to be cleaned and a position wherein the brush rests on the surface of the pipe. A brush arm retract spring is provided for urging the brush arm into the retracted position, and a cam mounted on the end of the brush arm opposite the brush moves the brush arm against the force of the retract springs to cause the brush to be engaged with the surface of the pipe for cleaning.

In more particular aspects of the present invention, the clamp comprises an inverted U-shaped member for placement over the edge of the face plate of the pipe facing machine, with a clamp jaw lock, which acts as a vise, gripping the face plate. In addition, a clamp wedge lock for engaging the face plate to prevent the U-shaped member from moving relative to the face plate under the influence of centrifugal forces developed during rotation is provided.

In another particular aspect of the invention, a brush holder mounting plate is mounted on the brush arm for receiving a brush holder. Both the brush holder mounting plate and the brush holder are adjustable in order to provide adjustment of the brush relative to the pipe surface to be cleaned.

BRIEF DESCRIPTION OF THE DRAWINGS

A more complete understanding of the invention and many of the attendant features thereof will be possible by reference to the following detailed description of the preferred embodiment as illustrated in the attached drawings wherein.

DESCRIPTION OF THE PREFERRED EMBODIMENT

Figure 1:
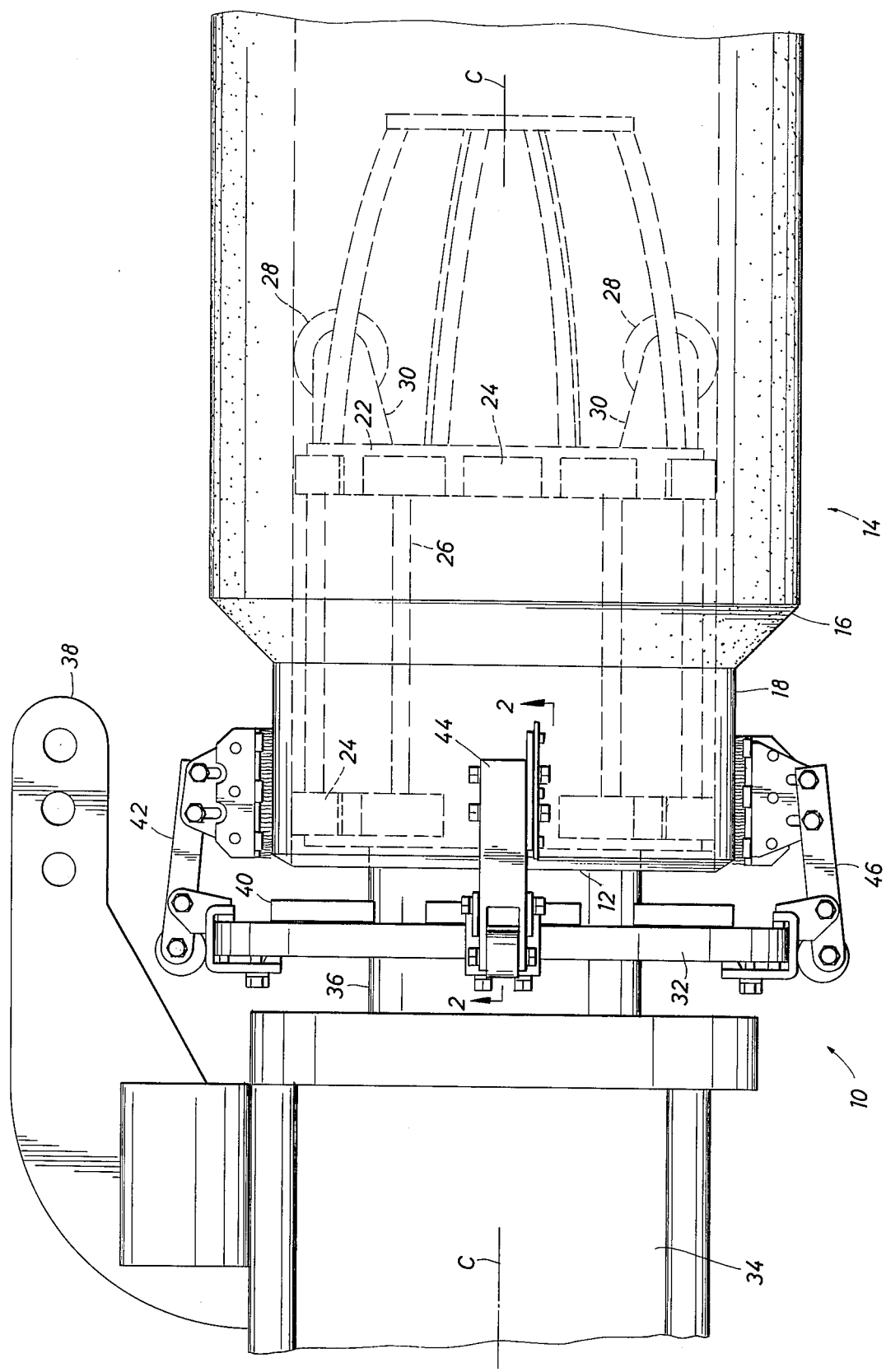
FIG. 1 is a side elevation view of a pipe facing machine positioned with respect to the end of a pipe section and having a plurality of pipe cleaning brush assemblies in accordance with the present invention mounted thereon.

Referring to the drawings, and more particularly to FIG. 1 thereof, there is shown a conventional pipe facing machine, generally designated by the reference number 10, for forming precision surfaces on the ends of large diameter pipes. Pipe facing machine 10 is shown in position proximate the end face 12 of a section of pipe generally referenced by numeral 14, which pipe has a protective mastic coating 16 thereon. It will be observed that there is a portion 18 of pipe section 14 that extends between the point of termination of coating 16 and the end face 12 of the pipe.

The pipe facing machine 10 comprises two spaced annular rings 20, 22, each having a circular array of clamping shoes 24. A cage-like series of connecting bars 26 join the two rings together. The rings also comprise an operating mechanism (not shown) for operating clamp shoes 24 to move them radially for engagement with the inside surface of pipe section 14. Actuation of clamp shoes 24 serves to place in accurate alignment the axis of the clamp cage with that of pipe section 14. Guide rollers 28 mounted on brackets 30 which are secured to the clamp cage assist in directing the clamp cage portion of pipe facing machine 10 as it is inserted into the pipe. The clamp cage of the machine is positioned far enough into pipe section 14 to bring face plate 32 into close proximity with end face 12.

Rigid face plate 32 is mounted for rotation relative to the clamp cage and to pipe end face 12. Pipe facing machine 10 also comprises a housing 34 that is interconnected with the clamp cage by a fixed, non-rotatable hollow shaft (not shown) having an external sleeve 36 which is integral with ridged face plate 32 such that the face plate can be driven in rotation by a hydraulic motor contained within housing 34.

A lift bar 38 is secured to housing 34 for lifting the entire machine, by a suitable crane or hoist, to insert the clamp cage into a pipe that is to be prepared.

Referring now specifically to face plate 32, mounted thereon are a plurality of cutting elements 40 disposed about face plate 32. Therefore, when face plate 32 is moved toward pipe end face 12, cutting elements 40 will be brought into contact therewith. A simple hydraulic system is provided for operating both the clamp shoes 24 and face plate 32. As cutting progresses, face plate 32 is advanced toward pipe end face 12 until the machining operation is finished.

In addition to the foregoing components which comprise pipe facing machine 10, and in accordance with this invention, four pipe cleaning bush assemblies of which only assemblies 42 and 44 are in view are mounted on face plate 32 for rotation therewith. The pipe cleaning assemblies are adapted for buffing the outside surface of portion 18 of pipe section 14. The pipe cleaning bush assemblies are retractable in order that they may be moved into or out of engagement with the pipe surface as desired.

Figure 2:
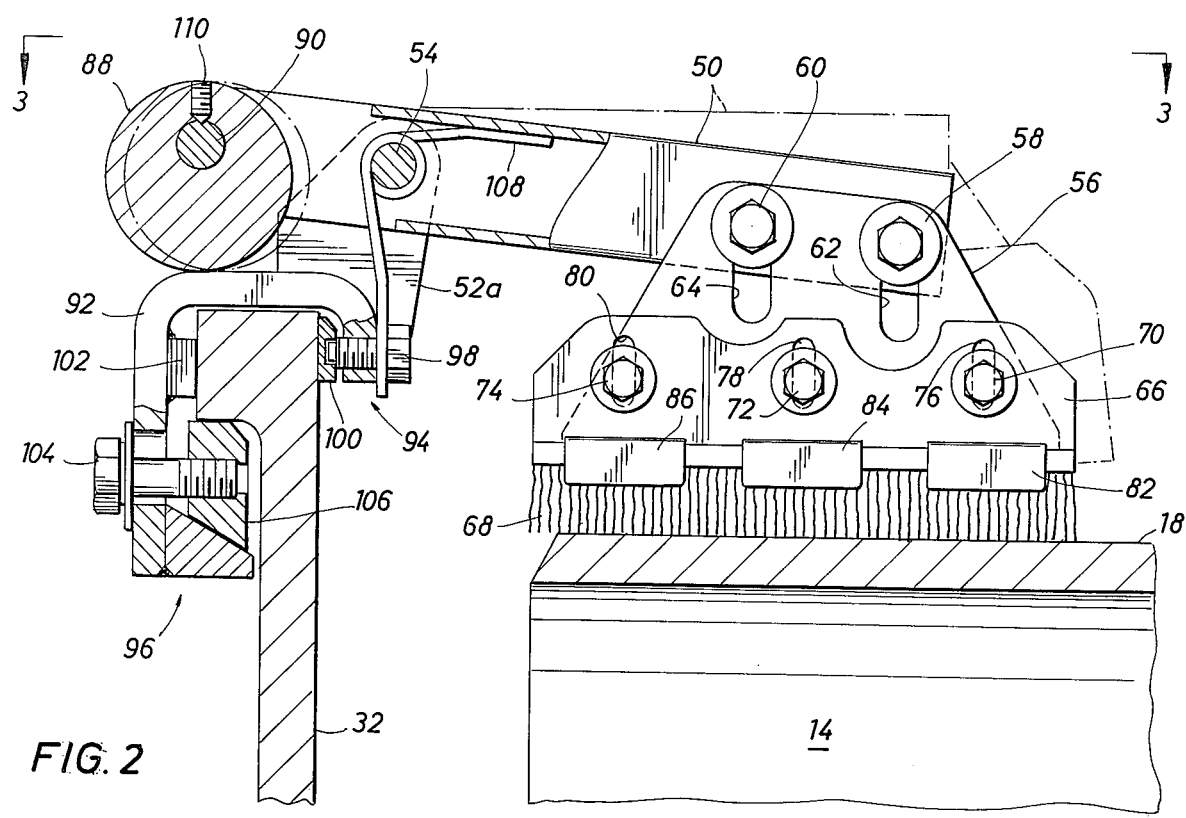
FIG. 2 is a side view of a representative one of the pipe cleaning brush assemblies on the pipe facing machine shown in FIG. 1.

Referring next to FIG. 2, there is a more detailed illustration of pipe cleaning brush assembly 42. In this view, a portion of face plate 32 and pipe section 14 are also shown in order to provide a better understanding of the manner in which the brush assembly is utilized with pipe facing machine 10 to achieve the intended results of cleaning the surface of the portion 18 of the pipe section. The pipe cleaning brush assembly comprises brush arm 50 which is pivotally mounted between pivot plates 52a and 52b which are secured with respect to face plate 32. Mounted at the forward end of brush arm 50 is brush holder mounting plate 56 which is secured to arm 50 by bolts 58 and 60. It will be further noted that plate 56 includes two vertically elongated slots through which bolts 58 and 60 extend. Attached to brush holder mounting plate 56 is brush holder 66 which is an elongated plate adapted to hold a steel wire brush 68. Brush holder 66 is attached to brush holder mounting plate 56 by three bolts 70, 72, 74 which extend through vertically elongated slots 76, 78, 80 formed in holder 66. Clamps 82, 84, 86 disposed along the lower edge of brush holder 56 provide the means of attachment for bush 68. It will be appreciated that the vertically elongated slots 62, 64 in the upper portion of mounting plate 56 and vertically elongated slots 76, 78, 80 in brush holder 66 provide vertical adjustment of brush 68 relative to brush arm 50 and thereby effect adjustment relative to the pipe surface.

At the opposite end of brush arm 50 is a cam lock 88 held therein by bolt 90. Cam lock 88 is attached to bolt 90 in a manner to be described hereinafter with regard to the view of FIG. 3.

Pivot plates 52a and 52b to which brush arm 50 is pivotally attached are secured to clamp 92 adapted for locking engagement onto face plate 32. Clamp 92 is an inverted U-shaped member having clamp jaw lock 94 mounted in one side and clamp wedge lock 96 mounted in the opposing side. More specifically, the edge of face plate 32 is inserted within clamp 92 and is engaged on the front side by clamp jaw lock 94 and is engaged on the back side by clamp wedge lock 96.

As will be observed, clamp jaw lock 94 comprises a bolt 98 that extends through one side of clamp 92 and carries a foot member 100 on its end. As bolt 98 is turned, it advances foot 100 inwardly toward the surface of face plate 32 and urges the back side of face plate 32 into engagement with block 102 which is securely attached to clamp 92. In effect, clamp jaw lock 94 in combination with block 102 on clamp 92 forms a vise-like mechanism.

Clamp wedge lock 96 is similar to clamp jaw lock 94 in that it too comprises a bolt 104 that is screwed into threads within clamp 92 and carries a foot member 106 for engaging the back side of the face plate 32. But rather than forming a vise-like mechanism, clamp wedge lock 96 forms a stop mechanism to prevent brush assembly 44 from being thrown-off of face plate 32 due to the centrifugal forces developed during rotation of the face plate.

Brush assembly 42 is also provided with a brush arm retract spring 108 extending between clamp 92 and brush arm 50. Retract spring 108 comprises a coil spring portion that encircles bolt 54 and has first and second arm extensions, one engaging clamp 92 and the other engaging brush arm 50. It will be appreciated that brush arm retract spring 108 applies a biasing force that urges brush arm 50 in a counter clockwise direction, counteracted by cam 88.

Figure 3:
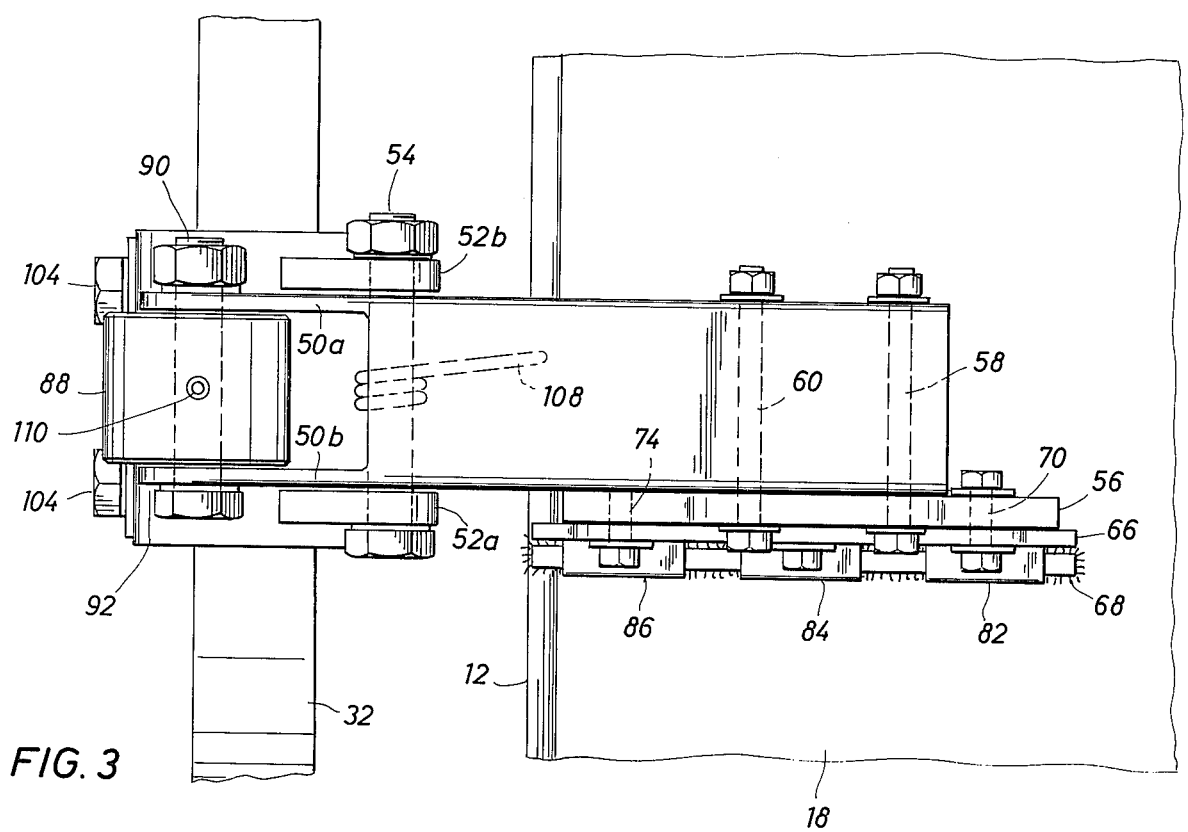
FIG. 3 is a plan view of the pipe cleaning brush assembly shown in FIG. 2.

Referring next to FIG. 3, in the plan view shown therein, brush arm 50 will be observed to have a clevis formed on the end opposite that which mounts brush 68. Specifically, brush arm 50 has extensions 50A and 50B which receive cam 88 therebetween. Bolt 90 which mounts cam 88 in extensions 50A, 50B is attached to cam 88 by set screw 110. Also, from this view pivot plate 52B is in view, illustrating further the pivotal mounting connection that plates 52A and 52B in combination with bolt 54 provide for brush arm 50. Further details may also be ascertained regarding brush arm retract string 108, which is observed to comprise a coil wound about the mid-section or shaft portion of bolt 54.

The view provided by FIG. 3 also affords an appreciation of the arrangement of and manner of interconnection between brush holder mounting plate 56, brush holder 66 and brush 68. In particular, it will be observed that brush 68 is a long, but narrow, brush that is carried adjacent, and not beneath, brush arm 50.

With reference once again to FIG. 2, the operation of pipe cleaning brush assembly 42 may be readily appreciated. As the pipe facing machine 10 is being installed on pipe section 14, the brush assemblies are in the retracted position. This position is illustrated in dotted outline in FIG. 2. After the pipe facing machine is installed on the pipe, bolt 90 which is attached to cam 88 by set screw 110 is turned approximately 90°. Turning of bolt 90 causes cam 88 to rotate and cam against the upper surface 93 of clamp 92 which is disposed directly beneath bolt 90. As cam 88 is turned, brush arm 50 is caused to pivot about bolt 54 against the biasing tension of brush arm retract spring 108. Clockwise pivoting of brush arm 50 about bolt 54 causes the forward end of brush arm 50 which mounts brush 68 to move downwardly, bringing brush 68 into contact with the surface of the pipe. Adjustment of the brush to get proper alignment and pressure is made by loosening bolts 58, 60 and 70, 72, 74. After the pipe is faced, bolt 90 is rotated back causing brush arm 50 to be pivoted counterclockwise, moving arm 50 and brush 68 into the retracted position shown in dotted outline.

The foregoing description of the invention has been directed to a particular preferred embodiment for purposes of explanation and illustration. It will be apparent, however, to those skilled in this art that many modifications and changes in the apparatus may be made without departing from the scope and spirit of the invention. Accordingly, the foregoing description is not to be considered limiting of applicant's invention, as the following claims are intended to cover all equivalent modifications and variations as fall within the scope of the invention.

What is claimed is:

1. In a pipe facing machine having a rotatable face plate for forming a precision machined surface on the end of a section of large diameter pipe as it is rotated with respect to the pipe, the improvement comprising:
    a pipe cleaning brush assembly mounted on said face plate for rotation therewith to clean the outer surface of the pipe proximate the end simultaneously with the machining of the end, said brush assembly including
    a brush arm having a brush at one end thereof and pivotally mounted with respect to said face plate at the opposite end to permit the brush to be positioned to bear against the pipe or to be retracted from the pipe surface and
    a cam at the pivotally mounted end of said brush arm for maintaining the brush arm in position when the brush is in contact with the pipe.

2. The apparatus of claim 1 wherein said pipe cleaning brush assembly comprises:
    a clamp for attachment to said face plate at the outer perimeter thereof, said brush arm is pivotally mounted to said clamp, and
    said brush is attached to the end of said brush arm.

3. The apparatus of claim 2 wherein said clamp comprises:
    an inverted U-shaped member for placement over the edge of said face plate;
    a clamp jaw lock acting as a vise to grip said face plate; and
    a clamp wedge lock for engaging said face plate to prevent said U-shaped member from moving relative to said face plate under the influence of centrifugal forces developed during rotation.

4. The apparatus of claim 2 wherein said pipe cleaning brush assembly further comprises:
    a pair of spaced apart pivot plates secured to said clamp for receiving said brush arm and mounting the same for pivotal movement; and
    a brush arm retract spring for urging said brush arm into the retracted position.

5. The apparatus of claim 4 wherein said brush arm has opposing extensions for receiving said cam therebetween with said cam being held therein by a shaft that is fixed relative to said cam and rotatable in the opposing extensions.

6. The apparatus of claim 2 wherein said pipe cleaning brush assembly further comprises:
    a brush holder mounting plate mounted on said brush arm; and
    a brush holder mounted on said brush holder plate.

7. A pipe cleaning brush assembly for mounting on the face plate of a pipe facing machine for rotation therewith to clean the outer surface of a large diameter pipe section proximate the end thereof simultaneously with the machining of the end face, which comprises:
    a clamp for attachment to the face plate at the outer perimeter thereof;
    a brush arm pivotally mounted on said clamp;
    a brush attached to one end of said brush arm; and
    a cam mounted at the opposite end of said brush arm for pivoting said brush arm between a retracted position wherein said brush is held above the pipe surface to be cleaned and a position wherein said brush rests on the pipe surface.

8. The apparatus of claim 7 including:
    a brush arm retract spring for urging said brush arm into the retracted position.

9. The apparatus of claim 8 wherein said clamp comprises:
    an inverted U-shaped member for placement over the edge of the face plate;
    a clamp jaw lock acting as a vise to grip the face plate; and
    a clamp wedge lock for engaging the face plate to prevent said U-shaped member from moving relative to the face plate under the enfluence of centrifugal forces developed during rotation.

10. The apparatus of claim 9 including:
    a brush holder mounting plate adjustably mounted on said brush arm; and
    a brush holder adjustably mounted on said brush holder plate.

* * * * *